(12) United States Patent
Seebauer

(10) Patent No.: US 11,980,949 B2
(45) Date of Patent: May 14, 2024

(54) DRILLING MACHINE

(71) Applicant: C.&E. Fein GmbH, Schwaebisch Gmuend-Bargau (DE)

(72) Inventor: Ralf Seebauer, Oberdachstetten (DE)

(73) Assignee: C.&E. Fein GmbH, Schwaebisch Gmuend-Bargau (DE)

( * ) Notice: Subject to any disclaimer, the term of this patent is extended or adjusted under 35 U.S.C. 154(b) by 44 days.

(21) Appl. No.: 17/380,539

(22) Filed: Jul. 20, 2021

(65) Prior Publication Data

US 2022/0016720 A1 Jan. 20, 2022

(30) Foreign Application Priority Data

Jul. 20, 2020 (DE) ...................... 20 2020 104 161.4

(51) Int. Cl.
*B23B 45/00* (2006.01)
*B25H 1/00* (2006.01)

(52) U.S. Cl.
CPC ......... *B23B 45/008* (2013.01); *B25H 1/0071* (2013.01); *B23B 2260/062* (2013.01); *B23B 2260/10* (2013.01); *Y10T 408/554* (2015.01)

(58) Field of Classification Search
CPC ... B23B 39/10; B23B 51/04; B23B 2260/062; B23B 2260/10; B23B 45/008; B23B 45/02; B23B 47/26; B25H 1/0071; B23Q 3/1543; B23Q 5/046; Y10T 408/554; Y10T 408/6786

See application file for complete search history.

(56) References Cited

U.S. PATENT DOCUMENTS

| | | | | |
|---|---|---|---|---|
| 2,775,904 A | * | 1/1957 | Edwards | B23B 45/02 477/18 |
| 5,282,704 A | * | 2/1994 | Screen | B25H 1/0071 408/124 |
| 5,902,076 A | * | 5/1999 | Miller | B25H 1/0071 408/11 |
| 6,102,633 A | | 8/2000 | Uehlein-Proctor | |
| 8,251,156 B2 | * | 8/2012 | Norona | B25F 5/001 173/52 |
| 10,583,539 B2 | * | 3/2020 | Timmons | B23Q 17/2404 |
| 11,139,722 B2 | * | 10/2021 | Velderman | H02K 21/16 |

(Continued)

FOREIGN PATENT DOCUMENTS

| | | | | |
|---|---|---|---|---|
| CA | 2296624 A1 | * | 5/2001 | ........... B25H 1/0071 |
| CN | 201644860 U | | 11/2010 | |

(Continued)

*Primary Examiner* — Ryan Rufo
(74) *Attorney, Agent, or Firm* — Muncy, Geissler, Olds & Lowe, P.C.

(57) ABSTRACT

A drilling machine, in particular a magnetic core drilling machine. The drilling machine having a magnetic base to detachably secure the drilling machine to a surface. A drive motor is arranged in a housing and has a rotor shaft with a rotor shaft longitudinal axis that is connected in a power-transmitting manner via a gear mechanism to a tool spindle with a spindle longitudinal axis. A tool holder is connected to the tool spindle to receive a drilling tool. The spindle longitudinal axis is aligned substantially parallel to the longitudinal axis of the rotor shaft, and the tool spindle is axially adjusted along the longitudinal axis of the spindle relative to the drive motor and the magnetic base.

13 Claims, 5 Drawing Sheets

(56) References Cited

U.S. PATENT DOCUMENTS

| | | | | |
|---|---|---|---|---|
| 11,541,526 B2 * | 1/2023 | Mucsi | .................. | H02P 6/14 |
| 11,602,795 B2 * | 3/2023 | Weatherill | ............. | B23Q 5/326 |
| 2004/0223820 A1 * | 11/2004 | Shieh | .................... | B23Q 5/385 |
| | | | | 408/76 |
| 2009/0028653 A1 * | 1/2009 | Wilbert | ................ | B25H 1/0071 |
| | | | | 408/76 |
| 2012/0145427 A1 * | 6/2012 | Fuchs | .................... | B25B 21/00 |
| | | | | 173/216 |
| 2018/0304453 A1 * | 10/2018 | Schaer | .................... | B25F 5/001 |
| 2021/0229230 A1 * | 7/2021 | Song | ..................... | B23Q 5/142 |

FOREIGN PATENT DOCUMENTS

| | | | | |
|---|---|---|---|---|
| CN | 105665773 A | * | 6/2016 | |
| DE | 20308443 U1 | * | 7/2003 | ........... B25H 1/0071 |
| DE | 202013008945 U1 | | 10/2013 | |
| EP | 2181812 A2 | * | 5/2010 | ........... B23B 45/008 |
| EP | 2 957 370 B1 | | 12/2017 | |
| GB | 408524 A | * | 4/1934 | |
| GB | 2170433 A | * | 8/1986 | ........... B23B 45/008 |
| JP | 2011251370 A | | 12/2011 | |

\* cited by examiner

DRILLING MACHINE

This nonprovisional application claims priority under 35 U.S.C. § 119(a) to German Patent Application No. 20 2020 104 161.4, which was filed in Germany on 20 Jul. 2020, and which is herein incorporated by reference.

BACKGROUND OF THE INVENTION

Field of the Invention

The present invention relates to a drilling machine, in particular a magnetic core drilling machine, having a magnetic base for detachably securing the drilling machine to a surface, having a drive motor which is accommodated in a housing and has a rotor shaft with a longitudinal axis of the rotor shaft, which is connected in a power-transmitting manner via a gear mechanism to a tool spindle with a longitudinal axis of the spindle, and having a tool holder connected to the tool spindle for receiving a drilling tool.

Description of the Background Art

Drilling machines of this type or magnetic core drilling machines have been known for a long time from the state of the art, for example from EP 2 957 370 B1, and are usually used to drill holes in metallic workpieces. Instead of twist drills, however, these magnetic drilling machines usually use drill bits to drill the holes in the workpiece.

In this case, the magnetic core drilling machine is first attached to the workpiece by the magnetic base, the magnetic force of which can usually be adjusted, and then the tool spindle together with the drill bit attached to it is moved towards the workpiece relative to the magnetic base, usually together with the drive motor. This has proved to be favorable, as it allows for a comparable simple mechanical solution to be achieved. However, it has proved disadvantageous that these magnetic core drilling machines are comparatively tall, so that their use in confined spaces—e.g., when using magnetic core drills in I-beams—has proved to be problematic.

SUMMARY OF THE INVENTION

It is therefore an object of the present invention to provide an improved, compact drilling machine.

In accordance with the invention, this object is achieved in a drilling machine in that the spindle longitudinal axis is aligned substantially parallel to the rotor shaft longitudinal axis and that the tool spindle is axially adjustable along the spindle longitudinal axis relative to the drive motor and the magnetic base.

In particular, due to the substantially parallel alignment of the longitudinal axis of the rotor shaft and the longitudinal axis of the spindle, the gear mechanism and thus the power transmission between the rotor shaft and the longitudinal axis of the spindle can be implemented particularly easily. This means, for example, that bevel gears can be dispensed with. Since the tool spindle can be adjusted relative to the drive motor at the same time, this design allows for a very compact drilling machine, the length of which can therefore be kept extremely short. In addition, this also reduces the weight to be moved, which has a positive effect on the performance of the drilling machine.

It has also proved particularly useful in the context of the invention if the drive motor is designed as an electrically commutated drive motor. By using an electrically commutated drive motor, which is often also referred to as an EC motor, the overall length of the drive motor can be made significantly shorter for the same motor power than, for example, in a universal motor, whereby a very low structure of the magnetic core drilling machine can be achieved. In addition, the use of an EC motor also reduces the maintenance effort, since these drive motors are designed to be brushless.

It has also proved advantageous when the rotor shaft longitudinal axis is oriented radially offset to the spindle longitudinal axis. This means that the rotor shaft and the tool spindle are axially offset with respect to a drill longitudinal axis that is oriented perpendicular to the rotor shaft longitudinal axis and the spindle longitudinal axis and are thus ultimately arranged next to each other. This also promotes a compact design of the drilling machine according to the invention. As a result, the drive motor can ultimately be mounted next to and no longer behind the tool spindle, whereby the magnetic core drilling machine can be formed very compactly.

It has also been shown to be advantageous if the gear mechanism has a first gear stage, a second gear stage and a third gear stage. The total of three gear stages allows for the power of the drive motor to be transmitted particularly well to the tool spindle.

If the gear stages are arranged in a row arrangement, the drilling machine can have a very low design. A slim design is further facilitated if the gear shafts of the gear stages lie in one plane with the longitudinal axis of the rotor shaft and the longitudinal axis of the spindle. In the context of the invention, the term "gear shaft" is understood to mean the shaft on which the individual gears or gearwheels of the respective gear stages are mounted in a rotationally fixed manner.

In order to achieve the greatest possible axial adjustment of the tool spindle, it has also proved useful if the meshing engagement of the individual gear stages is staggered axially. In this context, it has also proved particularly favorable if the meshing engagement of the first gear stage is closer to the magnetic base than the meshing engagement of the second gear stage and the meshing engagement of the third gear stage, and when the meshing engagement of the second gear stage is closer to the magnetic base than the meshing engagement of the third gear stage.

It has also been shown to be advantageous if, in the first gear stage which is directly connected to the rotor shaft, the drive pinion, which is connected to the rotor shaft in a rotationally fixed manner, is connected to the output gear via an intermediate gear or by means of a drive belt. The use of an intermediate gear, whose axis of rotation does not necessarily have to be in the same plane as the longitudinal axis of the spindle and the axis of the rotor shaft, it is ensured that the size of the drive motor, in particular its diameter, does not collide with the gear mechanism.

To prevent the risk of overloading the drilling machine and in particular the drive motor and the insert tools, it has also been shown to be favorable if a safety coupling is assigned to the gear shaft carrying the output gear of the first gear stage and the drive pinion of the second gear stage. This safety coupling ensures that, in the event of a limit torque being exceeded, which may occur, for example, when the insert tool is tilted in the workpiece, the safety coupling is released, thus reducing the risk of overloading the drilling machine. The drive pinions and the output gears of the individual gear stages can either be formed integrally with the gear shaft or be mounted on the respective gear shaft.

It has also proved useful to provide a quill guide for axially adjusting the tool spindle along the longitudinal axis of the spindle. This provides a simple way of moving the tool spindle axially along the longitudinal axis of the spindle.

It has also proved to be advantageous if the drive shaft carrying the output gear of the first gear stage and the drive pinion of the second gear stage is assigned a feed drive for the quill guide. This makes it possible to increase the axial stroke.

In order to adjust the tool spindle axially, it has also proved to be particularly advantageous if an adjuster for axial adjustment of the tool spindle is provided. This adjuster can be designed, for example, as a lever that can be turned by the user in order to adjust the tool spindle axially. In particular, the lever can also be detachably mounted on the housing, preferably by means of a positive and/or non-positive connection.

It has also proved advantageous if the height of the drilling machine is 200 mm or less, preferably 180 mm or less and particularly preferably 170 mm or less and most preferably 169 mm. This ensures that the drilling machine can also be used in particularly spatially confined conditions, for example in an I-beam. The height—also referred to as the headroom—of the drilling machine is understood to be its maximum axial extension along an axis that extends perpendicular to the bearing surface of the magnetic base.

It has also proved advantageous if the length of the drilling machine is 400 mm or less, preferably 350 mm or less and particularly preferably 280 mm or less and most preferably 265 mm. This further improves the possible use of the drilling machine according to the invention, and it is possible to use the drilling machine even where space is limited. The length of the drilling machine is understood to mean its maximum axial extension along the longitudinal axis, which extends parallel to the bearing surface of the magnetic base.

It has also proved to be useful if the distance between the longitudinal axis of the rotor shaft and the longitudinal axis of the spindle is 70 mm or more, preferably 90 mm or more and more preferably 110 mm or more, and further preferably 190 mm or less, more preferably 170 mm or less and particularly preferably 150 mm or less and most preferably 115 mm.

The handling and transport of the drilling machine can be further facilitated by providing a handle, preferably mounted on the housing. In this context, it has proved particularly advantageous if the handle is mounted on the housing so that it can be adjusted axially. This ensures that the handle does not protrude beyond the drilling machine when it will not be needed. In addition, the handle can be mounted in the housing under a spring-loading, making it easier for the user to extend and grasp the handle from the housing.

The intended use of the drilling machine can be further enhanced if an accumulator is provided to supply power to the electric motor. In particular, in the event the drilling machine is to be used to drill a hole in a remote place, an additional power cord does not have to be carried along.

It has also proved advantageous if drive electronics are provided which are accommodated in the housing. In this way, it is ultimately possible to provide only a single housing in which both the drive motor and the drive electronics are accommodated. This has a positive effect on the design of the drilling machine and reduces manufacturing costs. The housing can therefore accommodate both the electric motor and the drive electronics.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
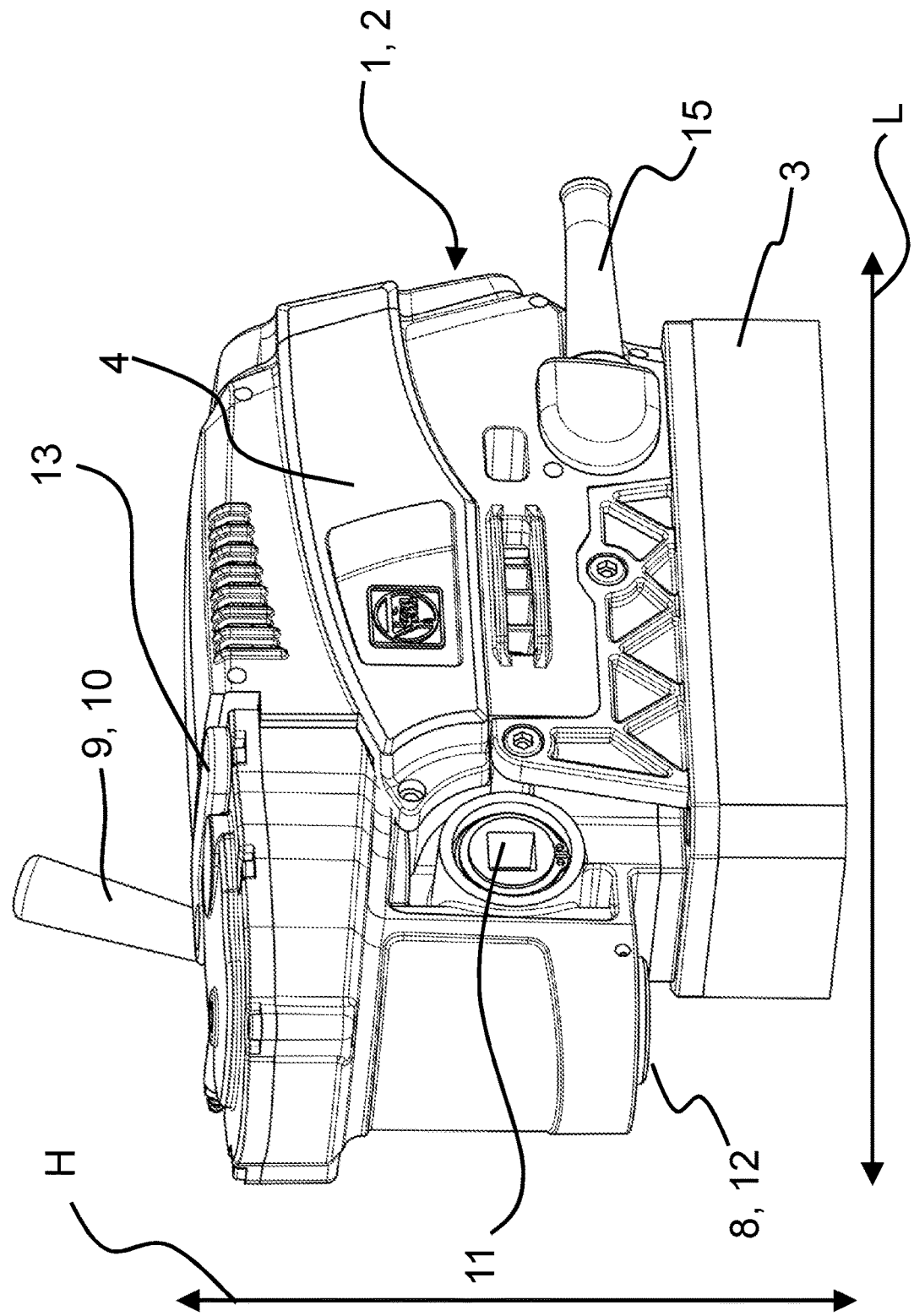
FIG. 1 is a perspective view of a drilling machine.

FIG. 1 shows a perspective view of a drilling machine 1, namely a magnetic core drilling machine 2. The latter has a magnetic base 3 with which the magnetic core drilling machine 2 can be detachably secured to a magnetizable surface. The resulting holding force of the magnetic base 3 can be electrically adjusted by the user between a maximum holding force and a minimum holding force. In addition, it can also be seen from FIG. 1 that the drilling machine 1 has a housing 4, in which—as can be seen in particular with reference to FIGS. 2 and 3 below—a drive motor 5 and drive electronics 6 are accommodated, wherein the drive motor 5 rotationally drives a tool spindle 8 via a gear mechanism 7. By means of a lever 9, which serves as an adjuster 10 and which can be inserted into a receptacle 11 formed adjacent to the housing 4, the user can adjust the tool spindle 8 and an insert tool inserted into a tool receptacle 12 connected to the tool spindle 8, preferably a drill bit, axially along a longitudinal spindle axis 14. In the drilling machine 1 shown, the receptacle 11 is provided in duplicate and is formed on both sides.

The drilling machine 1 shown in FIG. 1 has a height H of less than 200, namely exactly 169 mm. In addition, the length L of the drilling machine 1 is less than 400 mm, namely 265 mm. Although the power supply of the magnetic core drilling machine 2 shown in FIG. 1 is realized by a supply voltage, as can be taken from the indicated power cord 15, within the scope of the invention it is explicitly also provided that an accumulator is provided for supplying power to the magnetic core drilling machine 2. FIG. 1 also shows that a handle 13 is arranged on the housing 4, which can be grasped by the user in order to carry the drilling machine 1. The handle 13 is thereby adjustably mounted on the housing 4, whereby it is possible to lower it into the housing 4 so that it does not adversely change the size of the drilling machine 1 when it is not being used.

Figure 2:
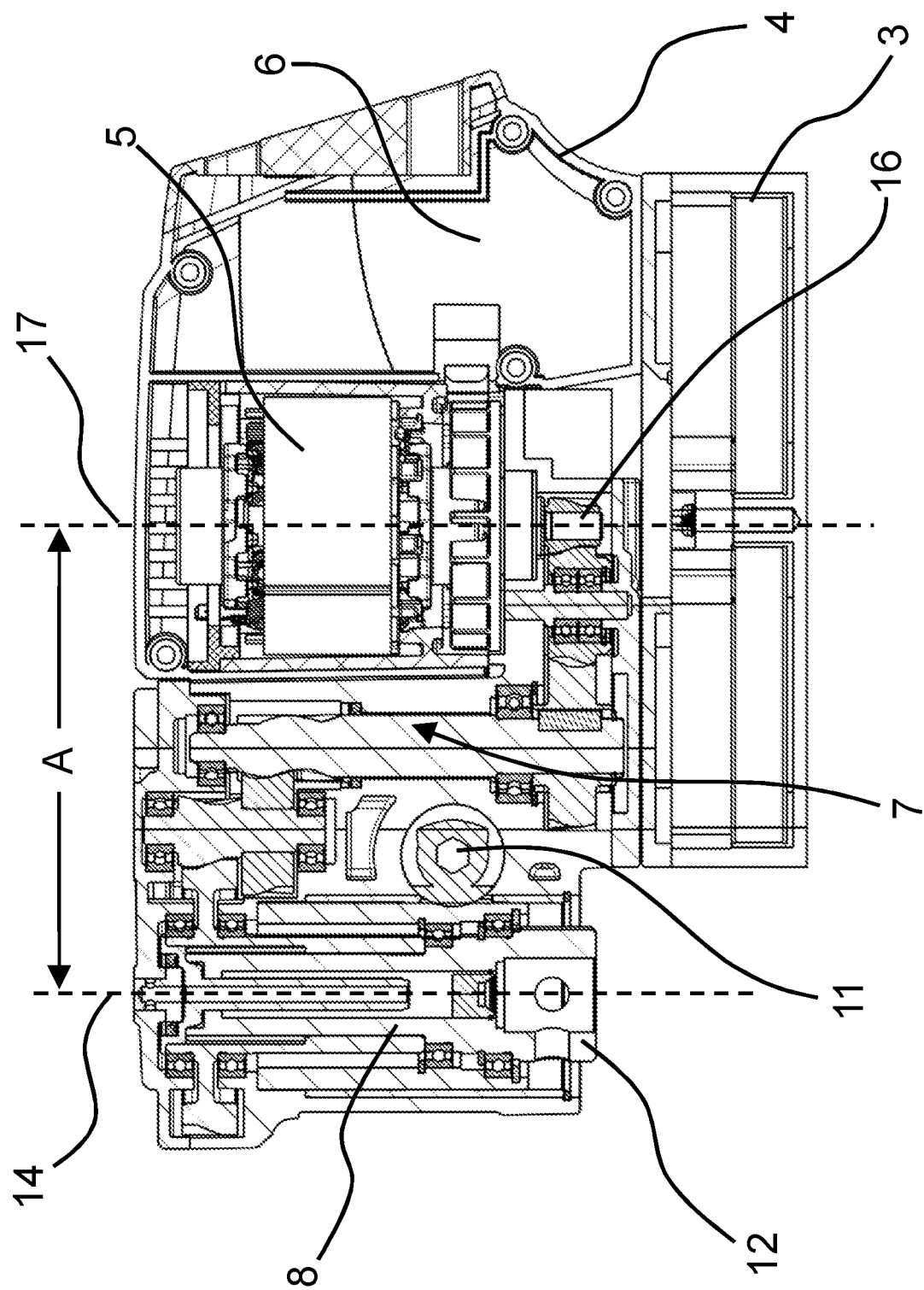
FIG. 2 is a sectional view through a longitudinal section of the drilling machine having a tool spindle in a first position.

FIG. 2 shows a sectional view along a longitudinal section of the structure of the drilling machine 1. This figure shows in particular that the drive motor 5 has a rotor shaft 16 with a rotor shaft longitudinal axis 17, which is connected to the tool spindle 8 via the gear mechanism 7 in a power-transmitting manner. The spindle longitudinal axis 14 of the tool spindle 8 is aligned parallel and radially offset to the rotor shaft longitudinal axis 17. At the end of the tool spindle 8, which points in the direction of the magnetic base 3, the tool holder 12 is arranged, into which a drill bit can be inserted. In the embodiment shown, the drive motor 5 is designed as an electrically commutated drive motor 5. This drive motor 5, which is also referred to as an EC drive motor 5, is characterized by a very low overall height and reduced maintenance costs as compared to a universal motor. The distance A of the rotor shaft longitudinal axis 17 to the spindle longitudinal axis 14 is 115 mm and thus more than 70 mm and at the same time less than 190 mm. FIG. 2 also shows that both the drive motor 5 and the drive electronics 6 are accommodated in the housing 4.

Figure 3:
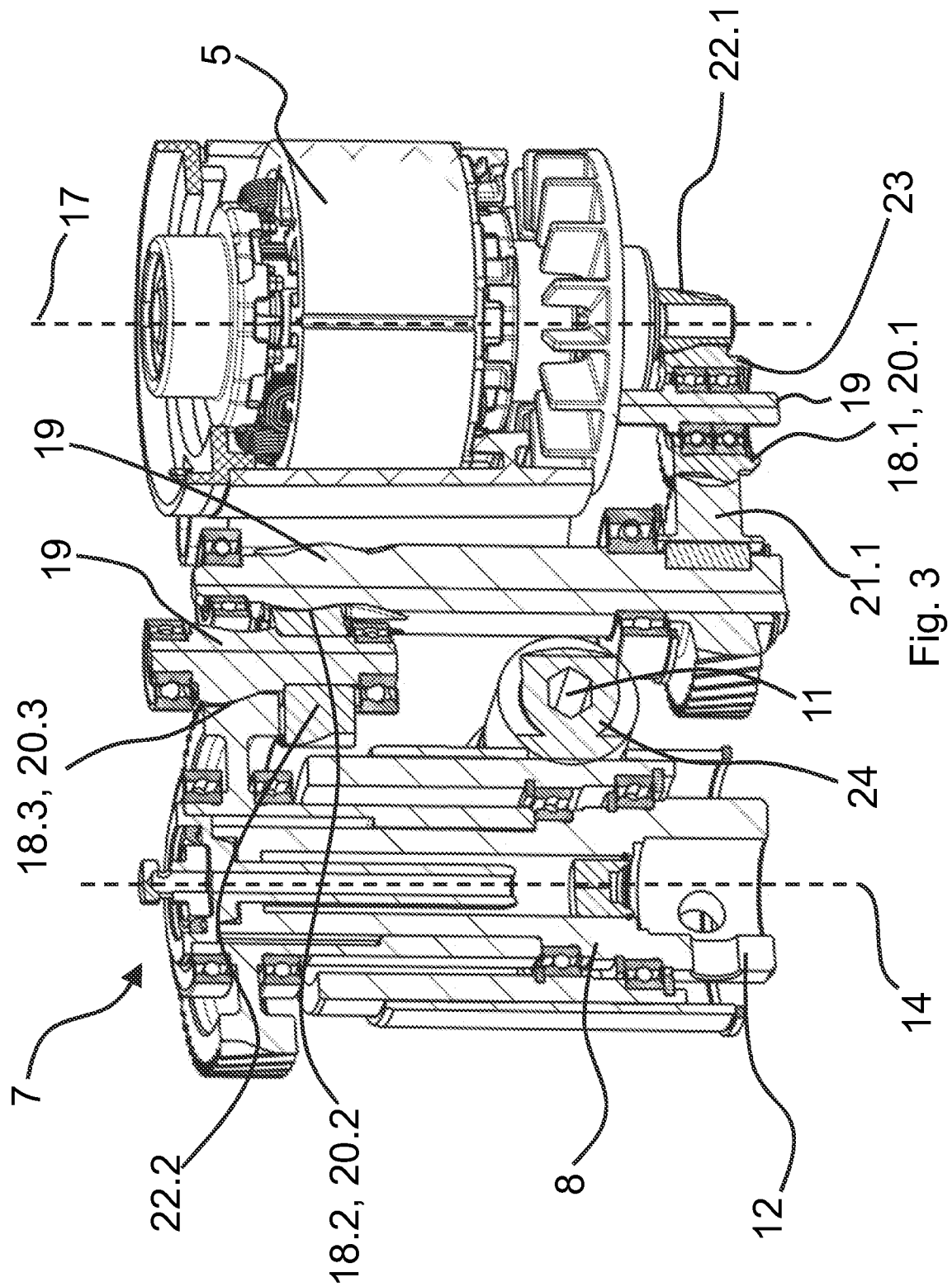
FIG. 3 is the sectional view from FIG. 2 with the tool spindle in a second position.

From the detailed view of a first embodiment of a gear mechanism 7 of the drilling machine 1 shown in FIG. 3, it is clear that the gear mechanism 7 of the drilling machine 1 comprises a first gear stage 18.1, a second gear stage 18.2 and a third gear stage 18.3, i.e. has a total of three gear stages 18.1, 18.2, 18.3. The individual gear stages 18.1, 18.2, 18.3 are arranged in a row, namely in such a way that the gear shafts 19 of the gear stages 18.1, 18.2, 18.3 lie in one plane with the rotor shaft longitudinal axis 17 and the spindle longitudinal axis 14. In addition, it can also be seen from FIG. 3 that the meshing engagements 20.1, 20.2, 20.3 of the individual gear stages 18.1, 18.2, 18.3 are axially staggered. This axial staggering oriented parallel to the rotor shaft longitudinal axis 17 occurs in such a way that the meshing engagement 20.1 of the first gear stage 18.1 is closer to the magnetic base 3 than the meshing engagement 20.2 of the second gear stage 18.2 and the meshing engagement 20.3 of the third gear stage 18.3. In addition, the meshing engagement 20.2 of the second gear stage 18.2 is located closer to the magnetic base 3 than the meshing engagement 20.3 of the third gear stage 18.3.

It can also be seen from FIG. 3 that a quill guide 24 is provided for axial adjustment of the tool spindle 8 along the longitudinal spindle axis 14, which can be achieved by rotating the lever 1. In this embodiment example of the gear mechanism 7, the gear shaft 19, which carries the output gear 21.1 of the first gear stage 18.1 and the drive pinion 22.2 of the second gear stage 18.2, can also be assigned a feed drive for the quill guide 24. As FIG. 3 also shows, in the first gear stage 18.1, which is directly connected to the rotor shaft 16, the drive pinion 22.1, which is rotationally fixed to the rotor shaft 16, is connected to the output gear 21.1 of the first gear stage 18.1 via an intermediate gear 23. The gear shaft 19, which carries the output gear 21.1 of the first gear stage 18.1 and the drive pinion 22.2 of the second gear stage 18.2, can also be assigned a safety coupling, which is triggered when a limit load is reached and interrupts the power transmission between the drive motor 5 and the tool spindle 8.

Figure 4:
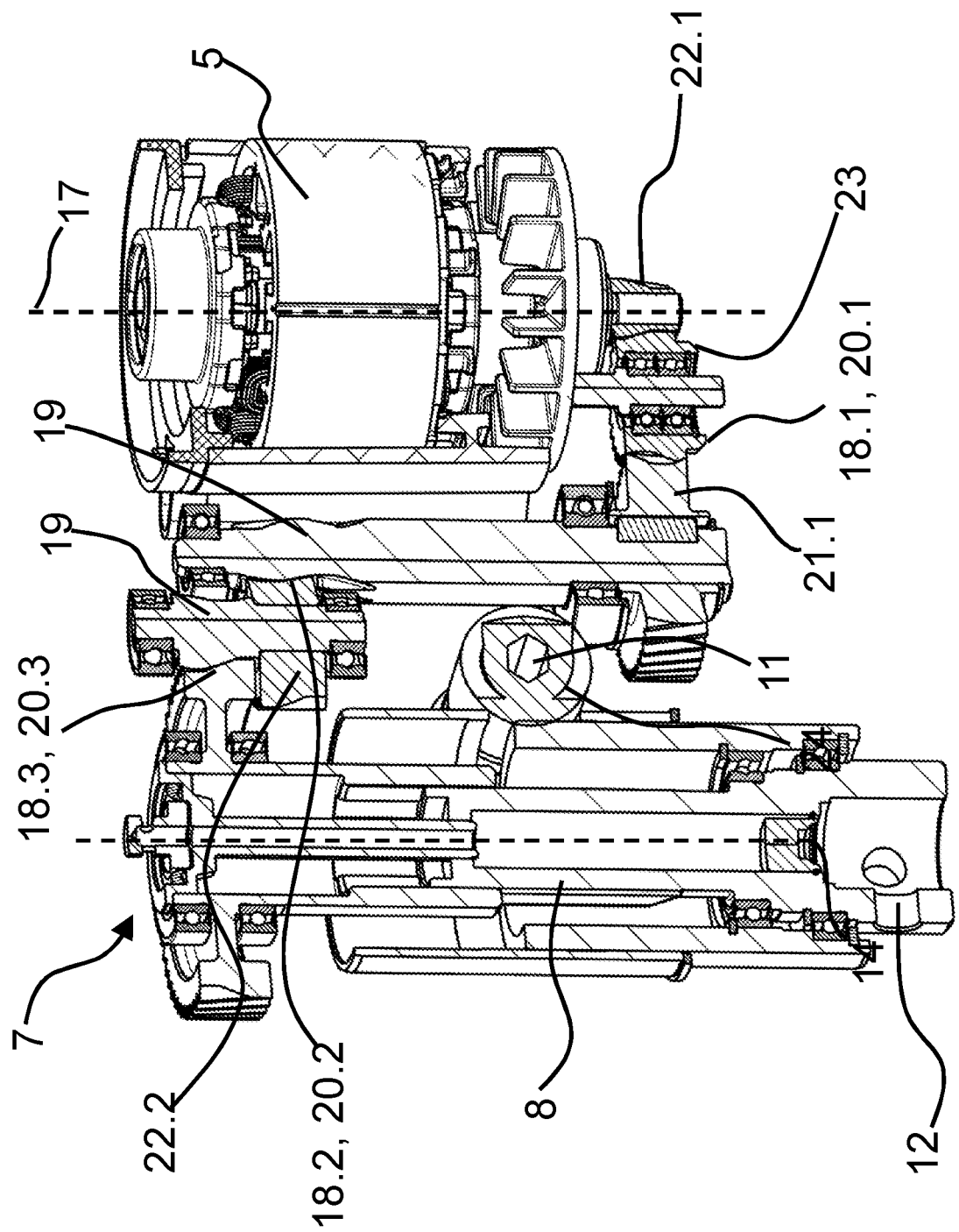
FIG. 4 is a detailed view of a first embodiment of a gear mechanism of the drilling machine.

While in the view of the gear mechanism 7 shown in FIG. 3 the tool holder 12 and the tool spindle 8 are retracted, FIG. 4 shows the tool holder 12 and the tool spindle 8 in the extended state, which is achieved by the user adjusting the lever 9, starting from the retracted position shown in FIG. 3. This causes the quill guide 24 to adjust the tool spindle 8 axially.

Figure 5:
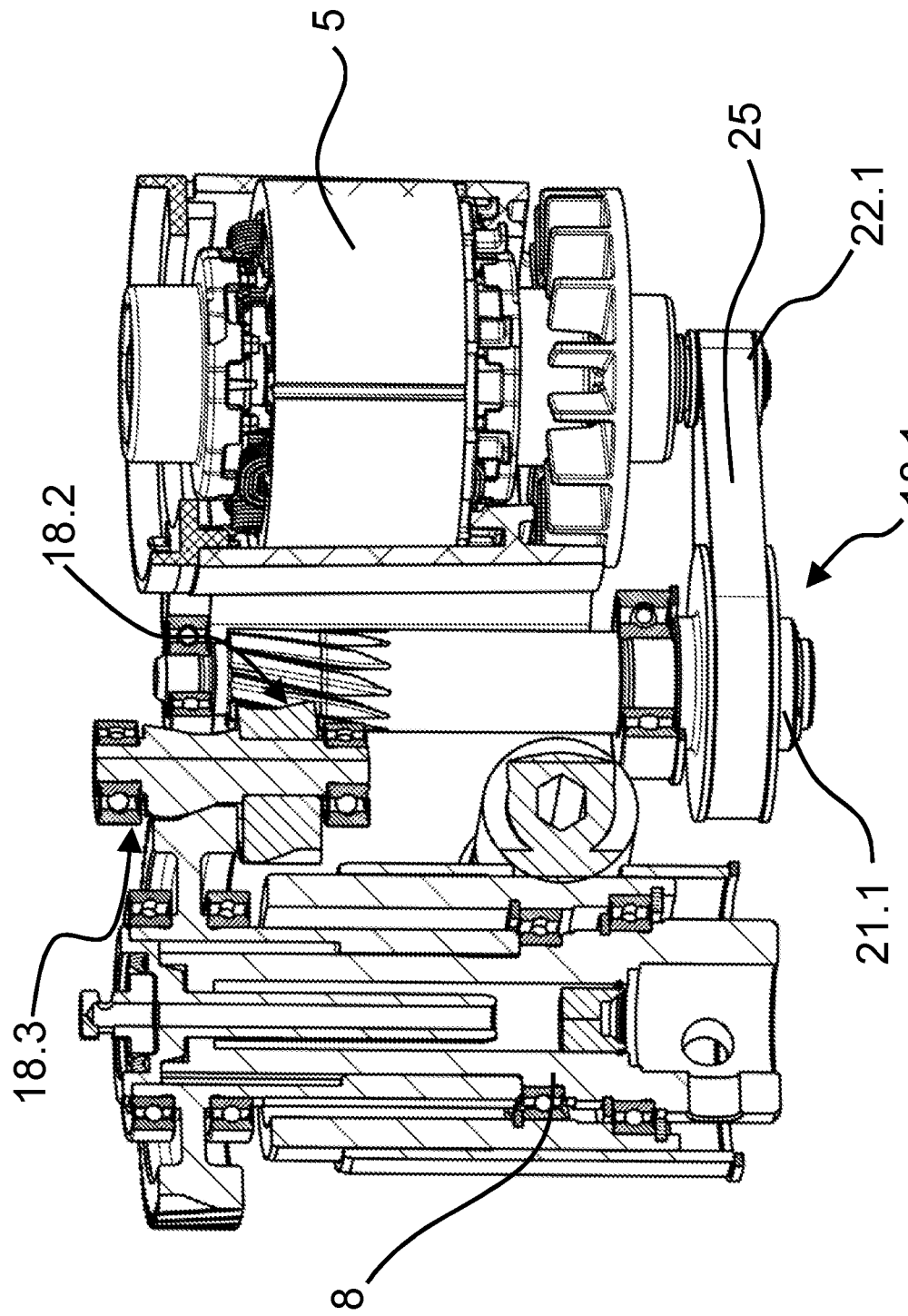
FIG. 5 is a detailed view of a second embodiment of the gear mechanism of the drilling machine.

FIG. 5 shows a second embodiment of the gear mechanism 7. This differs from the gear mechanism 7 shown in FIGS. 2 to 4 in that in the first gear stage 18.1, which is directly connected to the rotor shaft 16, the drive pinion 22.1, which is connected to the rotor shaft 16 in a rotationally fixed manner, is connected to the output gear 21.1 of the first gear stage 18.1 via a drive belt 25. This makes it possible to dispense with the use of the intermediate gear 23.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A drilling machine, the drilling machine comprising:
a magnetic base to detachably secure the drilling machine to a surface;
a drive motor arranged in a housing and having a rotor shaft with a rotor shaft longitudinal axis that is connected in a power-transmitting manner via a gear mechanism to a tool spindle with a spindle longitudinal axis; and
a tool holder connected to the tool spindle to receive a drilling tool,
wherein the spindle longitudinal axis is aligned substantially parallel to the rotor shaft longitudinal axis,
wherein the tool spindle is axially adjusted along the spindle longitudinal axis relative to the drive motor and the magnetic base,
wherein the drive motor is an electrically commutated drive motor,
wherein the gear mechanism includes a first gear stage, a second gear stage and a third gear stage,
wherein the first, second and third gear stages are arranged in a row arrangement one above the other in an axial direction with respect to the rotor shaft longitudinal axis, the rotor shaft longitudinal axis establishes a vertical upward direction and an opposite vertical downward direction such that the second gear stage is arranged vertically above the first gear stage and the third gear stage is arranged vertically above the second gear stage,
wherein, with respect to the vertical upward direction, the second gear stage is arranged vertically above the first near stage and the third pear stage is arranged vertically above the second gear stage, such that an uppermost surface of the first gear stage is positioned below a lowermost surface of the second pear stage and an uppermost surface of the second gear stage is positioned below a lowermost surface of the third gear stage,
wherein the lowermost surface of the third gear stage is vertically above the motor, and each of the rotor shaft, the uppermost surface of the first gear stage and the magnetic base is vertically below the motor,
wherein, in a radial direction with respect to the rotor shaft longitudinal axis, the first gear stage is positioned closer to the rotor shaft longitudinal axis than each of the second gear stage and the third gear stage, and the second gear stage is positioned closer to the rotor shaft longitudinal axis than the third gear stage,
wherein a height of the drilling machine is 200 mm or less, and
wherein a length of the drilling machine is 400 mm or less.

2. The drilling machine according to claim 1, wherein a respective gear shaft of each of the first, second, and third gear stages lie in a plane with the rotor shaft longitudinal axis and the spindle longitudinal axis.

3. The drilling machine according to claim 1, wherein meshing engagements of each of the first, second and third gear stages are axially staggered with respect to one another.

4. The drilling machine according to claim 1, wherein a meshing engagement of the first gear stage is closer to the magnetic base than a meshing engagement of the second gear stage and a meshing engagement of the third gear stage, and wherein the meshing engagement of the second gear stage is closer to the magnetic base than the meshing engagement of the third gear stage.

5. The drilling machine according to claim 1, wherein, in the first gear stage, which is directly connected to the rotor shaft, a drive pinion, which is connected to the rotor shaft in a rotationally fixed manner, is connected to an output gear via an intermediate gear or via a drive belt.

6. The drilling machine according to claim 1, wherein a quill guide is provided for axial adjustment of the tool spindle along the spindle longitudinal axis.

7. The drilling machine according to claim 1, wherein an adjuster is provided for axial adjustment of the tool spindle.

8. The drilling machine according to claim 1, wherein the height of the drilling machine is 180 mm or less, or 170 mm or less or 169 mm.

9. The drilling machine according to claim 8, wherein the length of the drilling machine is 350 mm or less, or 280 mm or less, or 265 mm.

10. The drilling machine according to claim 1, wherein a distance of the rotor shaft longitudinal axis to the spindle longitudinal axis is 70 mm or more, 90 mm or more, 110 mm or more, 190 mm or less, 170 mm or less, 150 mm or less, or 115 mm.

11. The drilling machine according to claim 1, wherein a handle is provided, the handle being mountable on the housing.

12. The drilling machine according to claim 11, wherein the handle is mounted on the housing to be axially adjustable with respect to the rotor shaft longitudinal axis.

13. The drilling machine according to claim 1, wherein drive electronics are provided, which are accommodated in the housing.

\* \* \* \* \*